(12) United States Patent
Green

(10) Patent No.: US 8,174,823 B2
(45) Date of Patent: May 8, 2012

(54) COMPUTER MONITOR WITH A SHELF

(75) Inventor: Andrew Green, Mount Pleasant, SC (US)

(73) Assignee: Twelve South LLC, Mount Pleasant, SC (US)

( * ) Notice: Subject to any disclaimer, the term of this patent is extended or adjusted under 35 U.S.C. 154(b) by 192 days.

(21) Appl. No.: 12/815,521

(22) Filed: Jun. 15, 2010

(65) Prior Publication Data

US 2010/0315768 A1 Dec. 16, 2010

Related U.S. Application Data

(60) Provisional application No. 61/187,002, filed on Jun. 15, 2009.

(51) Int. Cl.
*G06F 1/16* (2006.01)

(52) U.S. Cl. .................................................. 361/679.25

(58) Field of Classification Search .............. 361/679.25
See application file for complete search history.

(56) References Cited

U.S. PATENT DOCUMENTS

| | | | |
|---|---|---|---|
| 5,357,873 A | 10/1994 | Hilton | |
| 5,590,607 A | 1/1997 | Howard | |
| 5,738,320 A | 4/1998 | Matos et al. | |
| 5,868,079 A | 2/1999 | Charny | |
| 6,100,942 A * | 8/2000 | Hollenbaugh et al. | ........ 348/836 |
| 6,146,158 A | 11/2000 | Peratoner et al. | |
| 6,208,505 B1 * | 3/2001 | Kuchta et al. | ............ 361/679.08 |
| 6,244,555 B1 | 6/2001 | Benja-Athon | |
| 6,332,407 B1 | 12/2001 | Vardaro | |
| 6,736,469 B2 | 5/2004 | Long | |
| 6,839,227 B1 * | 1/2005 | Correa | ..................... 361/679.23 |
| 7,008,028 B2 | 3/2006 | Probst | |
| 7,100,883 B2 * | 9/2006 | Ramey et al. | .............. 248/442.2 |
| 7,172,166 B2 | 2/2007 | Wang | |
| 7,341,235 B2 * | 3/2008 | Okamoto | ....................... 248/638 |
| 7,389,997 B2 | 6/2008 | Johnson et al. | |
| 7,481,170 B2 | 1/2009 | Sommerfield | |
| 7,506,592 B2 | 3/2009 | Rossini | |
| 7,513,579 B2 | 4/2009 | Nay et al. | |
| 7,551,432 B1 * | 6/2009 | Bockheim et al. | ........ 361/679.27 |
| 7,559,520 B2 * | 7/2009 | Quijano et al. | ............ 248/309.1 |
| 7,593,219 B2 * | 9/2009 | Quijano et al. | .......... 361/679.22 |
| 7,621,544 B2 | 11/2009 | Rossini | |
| 7,823,856 B2 * | 11/2010 | Schwartz et al. | .......... 248/442.2 |
| 8,009,414 B2 * | 8/2011 | Ishida et al. | ............. 361/679.25 |
| 8,081,429 B2 * | 12/2011 | Horie | ....................... 361/679.02 |
| 8,081,436 B2 * | 12/2011 | Lin et al. | ................. 361/679.23 |
| 2004/0228077 A1 * | 11/2004 | Hall et al. | ..................... 361/681 |
| 2004/0240167 A1 * | 12/2004 | Ledbetter et al. | ............. 361/683 |
| 2006/0091280 A1 * | 5/2006 | Rothschild | ................. 248/442.2 |
| 2007/0076358 A1 * | 4/2007 | Hsu | .................................. 361/681 |
| 2009/0008349 A1 * | 1/2009 | Kim | ............................. 211/150 |

* cited by examiner

*Primary Examiner* — Lisa Lea Edmonds

(74) *Attorney, Agent, or Firm* — W. Edward Ramage; Baker Donelson

(57) ABSTRACT

A computer monitor is supported by a stand connected to the back of the monitor. A shelf is positioned behind the computer monitor, where the shelf is connected to either the stand or the computer monitor back surface. The shelf has a flat portion which is essentially horizontal for holding various items.

20 Claims, 9 Drawing Sheets

COMPUTER MONITOR WITH A SHELF

This application claims priority to U.S. Provisional Patent Application No. 61/187,002, titled COMPUTER MONITOR WITH A SHELF, filed Jun. 15, 2009, which is hereby incorporated in its entirety by reference.

BACKGROUND OF THE INVENTION a. Field of the Invention

This invention relates to storage devices used with computers.

b. Description of the Related Art

Computers have become commonplace, and are now present in many households. A significant portion of the population now has regular access to a computer. The number of computers sold has increased, and the computer has changed with many technological advances. There are different types of computers, and those commonly available as designed for use by the general population are generally referred to as personal computers. Many companies now compete to supply personal computers, and the competition tends to drive new developments.

Personal computers come in a variety of formats. There are laptop computers, where the display and the keyboard are connected by a hinge-type connector. Many of the electronic components necessary for the operation of the laptop computer can be positioned within the keyboard portion of the computer. The display portion of many computers is referred to as the monitor. Laptop computers are often designed for portability, and the computer will fold up to protect the display surface and the keyboard. Another type of computer is the desktop computer, which typically includes a display and a separate container for many electronic components of the computer. The separate container can be referred to as a "tower." There can also be a separate keyboard and a separate mouse. The various components can be connected by wires, but at least some of the components can be communicate wirelessly.

All-in-one computers generally include a display device with the electronic components necessary for the computer operations being contained within the same enclosure as the display device. There can be a separate keyboard and/or mouse, which can be connected either by wires, but more often the keyboard and/or mouse communicate with the computer wirelessly.

As technology progresses, the size of computers has tended to become smaller, and the capabilities have increased. The smaller size can provide a benefit because less space is needed for the computer. This allows the computer to be used in smaller areas, or it allows for more free space available after the computer is put in place. Additional free space can be used for other tasks, such as viewing documents or papers, storing items, setting up equipment to communicate with the computer (such as a camera or music storage and playing device), or simply to present a cleaner and more open appearance to a work space.

BRIEF SUMMARY OF THE INVENTION

A computer monitor is supported by a stand connected to the back of the monitor. A shelf is positioned behind the computer monitor, where the shelf is connected to either the stand or the computer monitor back surface. The shelf has a flat portion which is essentially horizontal for holding various items.

DETAILED DESCRIPTION

The Computer Monitor

Figure 1:
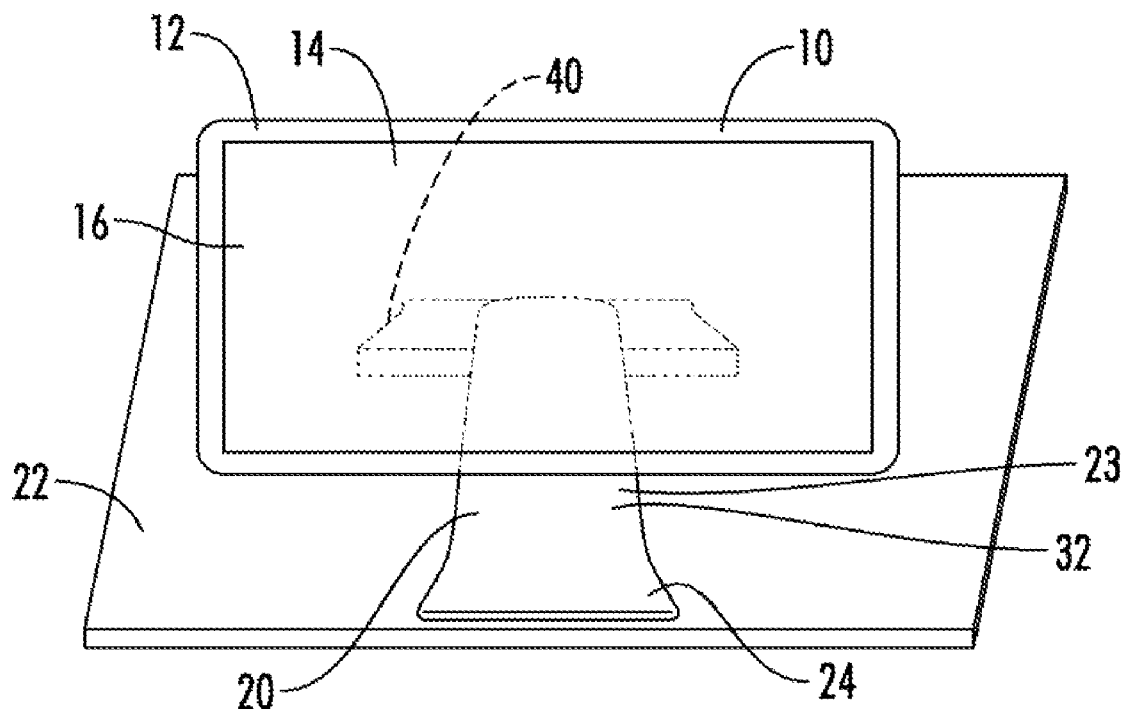
FIG. 1 is a front view of an all-in-one computer and monitor on a stand on a table.
Figure 2:
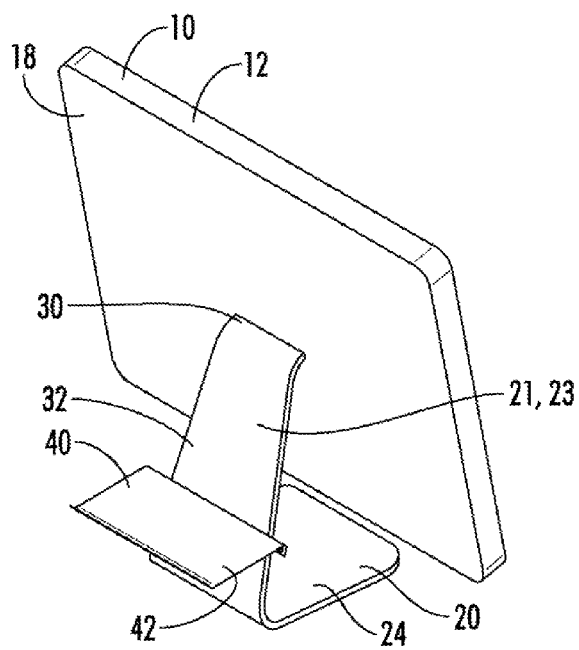
FIG. 2 is a perspective back view of an all-in-one computer and monitor on a stand with a shelf.
Figure 3:
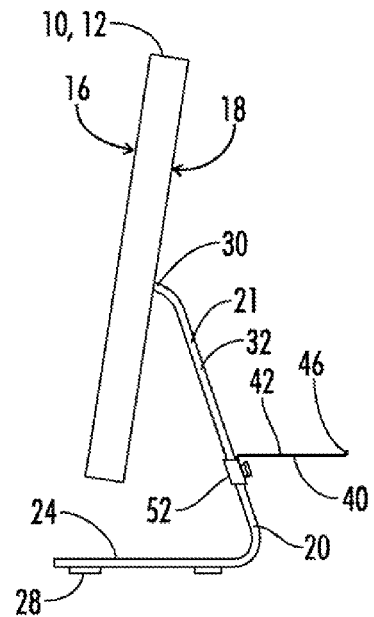
FIG. 3 is a side view of an all-in-one computer and monitor on a stand with a shelf.
Figure 4:
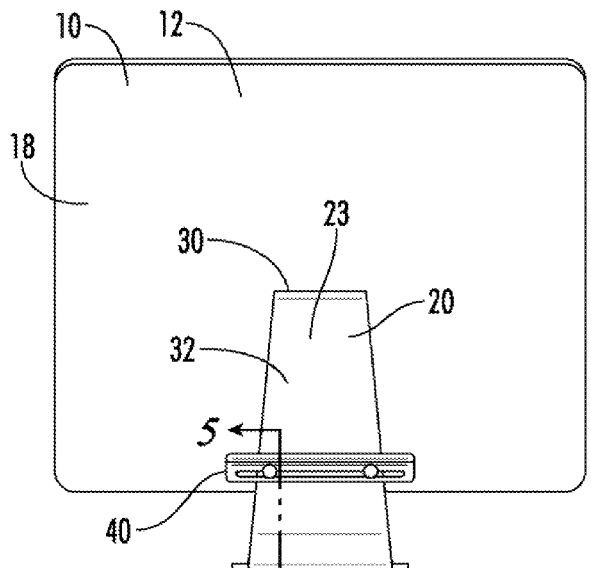
FIG. 4 is a back view of an all-in-one computer and monitor on a stand with a shelf.
Figure 5:
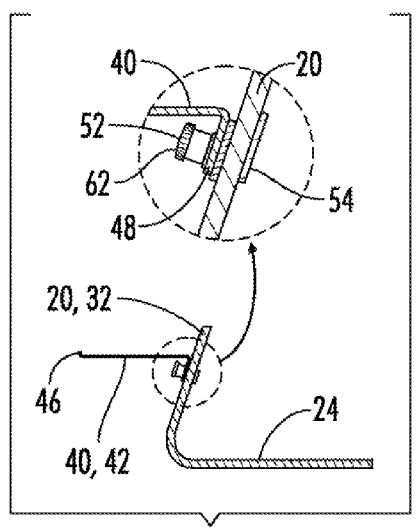
FIG. 5 is a side view of a sectioned stand with an attached shelf, where the shelf attachment is also shown in greater detail.

A computer monitor 10 is used for viewing information displayed by a computer 12, as seen in FIGS. 1 through 5. The information is displayed on a screen 14, which is on a monitor front end 16. The monitor 10 also has a back end 18, which is generally not designed for routine viewing. The term "monitor" in this description includes the screen 14 and the housing in which the screen 14 is located. Therefore, all-in-one type computers 12 fall within the definition of a monitor 10, because the computer 12 and the screen 14 are both within the same housing. There can be connection wires, written instructions, connection ports, embedded graphics, attached barcodes, and printed information relating to the monitor on the monitor back end 18. The monitor back end 18 typically includes many functional aspects of the monitor 10 which may be less attractive, and style and appearance is less important because the monitor back end 18 is not usually seen.

The screen 14 often dominates the monitor front end 16. There may be some material bordering the screen 14, and there can also be some controls. Some monitor front ends 16 include a light to indicate the monitor 10 is turned on, and there can be trademark graphics to indicate the manufacturer of the monitor 10. The monitor front end 16 can also include other components. Generally, style and appearance are important considerations for a monitor front end 16, because this is the portion of a computer most commonly viewed. The monitor front end 16 is also presented towards people to display information, so the overall appearance and style can be seen by the user as well as by others passing by. Many manufacturers avoid placing some functional components on a monitor front end 16 because of the overall appearance, and also to prevent obstructions between the user and the screen 14.

There are differences between a computer monitor 10 and a television. A computer monitor 10 is typically smaller than a television monitor, although there are examples of computer monitors 10 which are larger than television monitors. A computer monitor 10 is generally designed to be viewed from a relatively close distance, as opposed to a television monitor which is generally designed to be viewed from larger distances. Although computers 12 can be used for entertainment, the general design of many computers 12 is directed more towards accomplishing tasks, as opposed to a television which is designed primarily for entertainment and viewing. A user provides little input to a television other than selecting the material to be watched, but computers 12 are often designed for significant input from a user. These basic differences in a television and a computer monitor 10 are also seen in the video signal format. In some embodiments, there are different video signal formats for computer monitors 10 and televisions, with some basic differences in how the display is produced. It is possible to use a television as a computer monitor 10, and vice versa, but an adaptor may be needed.

The computer monitor 10 operates with a computer 12, and often the computer 12 is a personal computer 12. This can include an all-in-one type of computer 12, where the electronics the process data are incorporated into the housing for the computer monitor 10, such as in the Figures. In an all-in-one computer 12, the keyboard can be a separate, free-standing component. The computer 12 can also have a lap-top style, where a keyboard has a separate housing from the monitor 10, and the keyboard housing and the monitor housing are connected by a hinge type of device. The computer 12 can also be a desk-top style, where many of the electronics which process data are in a separate housing, sometimes referred to as a tower. The computer monitor 10 has a housing, and the keyboard can be a separate device. The various components can communicate using wires, or the communications can be wireless.

Stand

A stand 20 can be used to support the computer monitor 10. The stand 20 can be adjustable or fixed, and it can suspend the monitor 10 or support the monitor on a working surface 22, such as a table top. The stand 20 is connected to the monitor back end 18, so the stand 20 is positioned behind the monitor 10. Positioning the stand 20 behind the monitor 10 prevents the stand from blocking the user's view of the screen 14, and also at least partially keeps the stand 20 out of sight. In many cases at least a portion of the stand 20 can be seen, so appearance can be important, but at least some of the stand 20 is positioned behind the monitor 10 where it is not seen as frequently as the monitor front end 16.

The stand 20 includes a base 24 which rests on the working surface 22. The base 24 provides stability to the stand 20, so the base 24 can be broad, especially if the stand 20 suspends the monitor 10. If the monitor 10 is suspended, where the monitor is supported by only the stand 20, then at least a portion of the stand 20 may be visible. At least the base 24 may be visible, so a stylish appearance may be desired.

Figure 6:
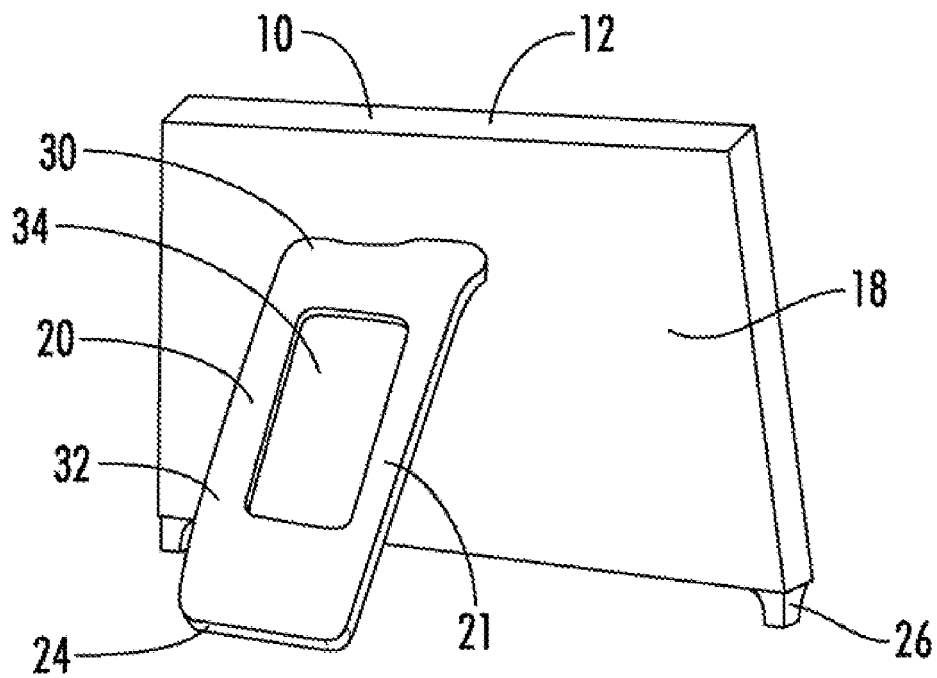
FIG. 6 is back perspective view of an alternate embodiment of an all-in-one computer and monitor on a stand.
Figure 7:
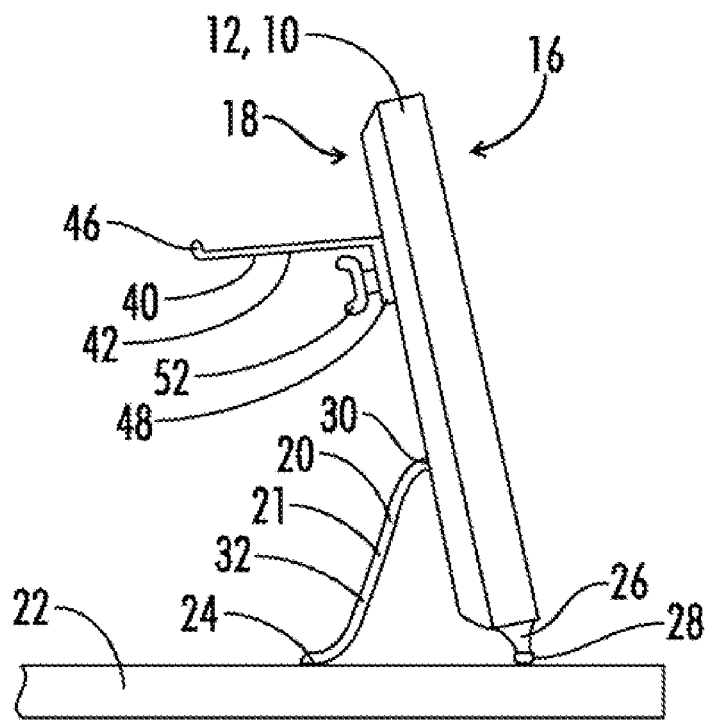
FIG. 7 is a side view of an all-in-one computer and monitor on a stand with a shelf.

If the monitor 10 rests at least partially on the working surface 22, such as on legs 26, the stand 20 may primarily serve to prevent the monitor 10 from falling over, as seen in FIGS. 6 and 7 with continuing reference to FIGS. 1-5. In this case, the stand 20 may be less visible, and the base 24 may be small because some of the stability of the monitor 10 is provided by the legs 26 or by the portion of the monitor 10 sitting on the working surface 22.

The base 24 can include protective pads 28 to reduce the chances of the stand 20 scratching or marring the working surface 22. The protective pads 28 are positioned between the base 24 and the working surface 22, and can be made of fabric, plastic, rubber, or any of a wide variety of materials. Protective pads 28 can be at least somewhat soft to prevent scratches, and protective pads 28 can be used in many locations other than just under the base 24. Protective pads 28 can be positioned between any two surfaces to provide protection. Protective pads 28 can also serve other functions, such as increasing or decreasing the coefficient of friction, so the surfaces tend to stick together or tend slide over each other. Different materials can be used to change the coefficient of friction. Protective pads 28 can also be used as a shim, so different surfaces can be better aligned.

The stand 20 also includes a monitor attachment 30. The monitor attachment 30 is the portion of the stand 20 that connects to the computer monitor 10. The monitor attachment 30 connects to the monitor back end 18, and is generally not seen because it is behind the monitor 10. The monitor attachment 30 can include a hinge or other flexible connection to allow the monitor 10 to move relative to the stand 20. In one embodiment, the flexible connection allows the monitor 10 to move within one plane, such as only up and down. In another embodiment, the flexible connection allows the monitor 10 to move in multiple planes. The monitor attachment 30 can allow the stand 20 to directly connect to the monitor back end 18.

The monitor attachment 30 can provide a connection to the monitor 10 that is stiff, so the monitor 10 does not move relative to the stand 20 unless an outside force is applied. So, the monitor attachment 30 holds the monitor 10 in one position unless a user moves the monitor 10, or some other force is applied. Some monitors 10 have a connection system which follows certain standards, such as the VESA standard. If a monitor 10 has a connection that complies with a standard, the user has a better chance of being able to change the type of stand 20 used for the monitor 10 without obtaining an adaptor for a different type of connection. The monitor attachment 30 may also incorporate standard connections in some embodiments, but more unique connections are used in other embodiments as necessary to properly engage the different monitors 10.

Figure 8:
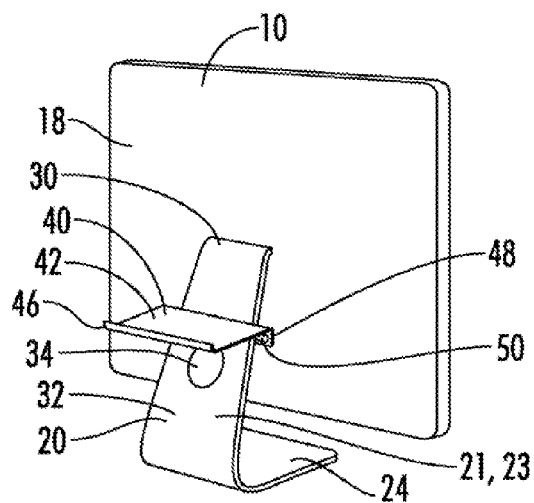
FIG. 8 is a back perspective view of a computer monitor supported on a stand with a shelf.

An arm 32 is the part of the stand 20 that connects the base 24 and the monitor attachment 30. At least a portion of the arm 32 may be visible from in front of the monitor 10, so appearance and style can be a design consideration. The arm 32 can define a hole 34, which can impart style as well as reduce the weight of the stand 20, as seen in FIG. 8, with continuing reference to FIGS. 1-7. The arm 32 is often angled from the working surface 22 toward the monitor 10, so the arm 32 has a slanted appearance. There are also stand embodiments where the arm 32 extends vertically from the working surface 22.

Figure 9:
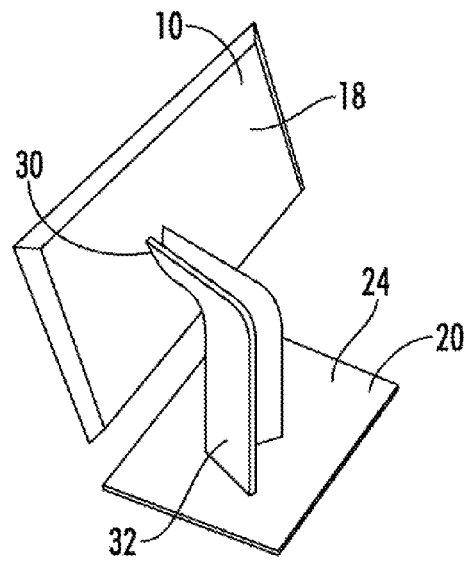
FIG. 9 is a back perspective view of another embodiment of a computer monitor supported on a stand with a shelf.
Figure 10:
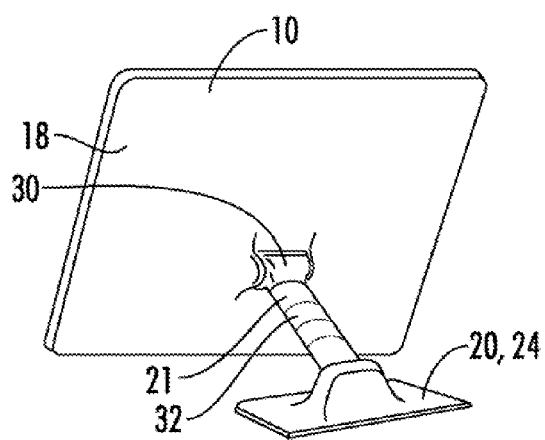
FIG. 10 is a back perspective view of yet another embodiment of a computer monitor supported on a stand with a shelf.
Figure 11:
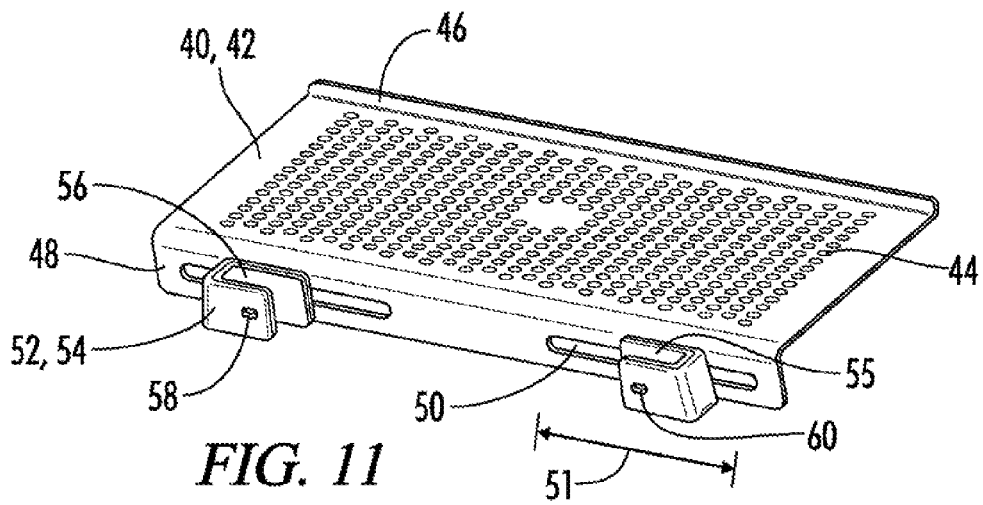
FIG. 11 is a perspective view of one embodiment of a shelf.
Figure 12:
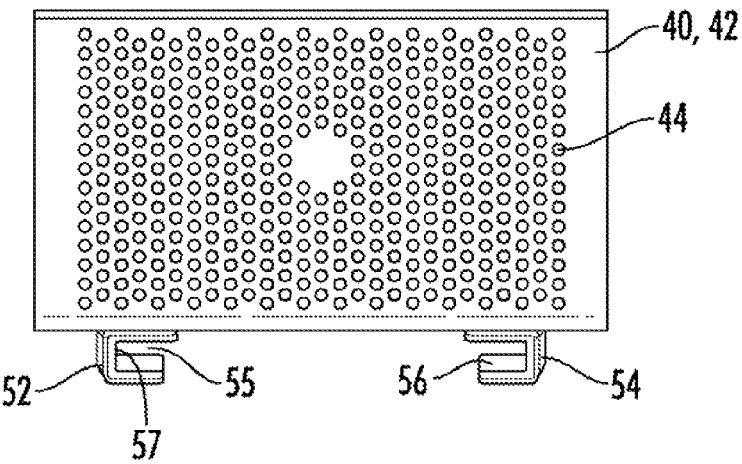
FIG. 12 is a top view of one embodiment of a shelf.
Figure 13:
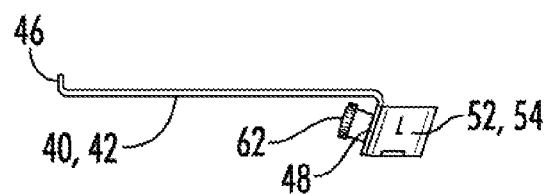
FIG. 13 is a side view of one embodiment of a shelf.
Figure 14:
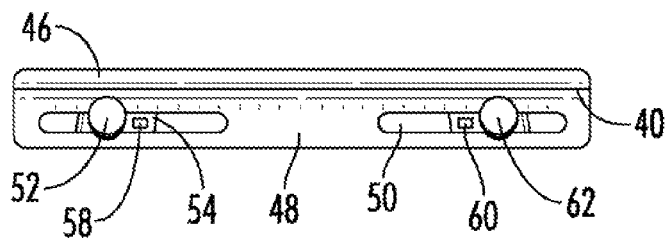
FIG. 14 is a back view of one embodiment of a shelf.
Figure 15:
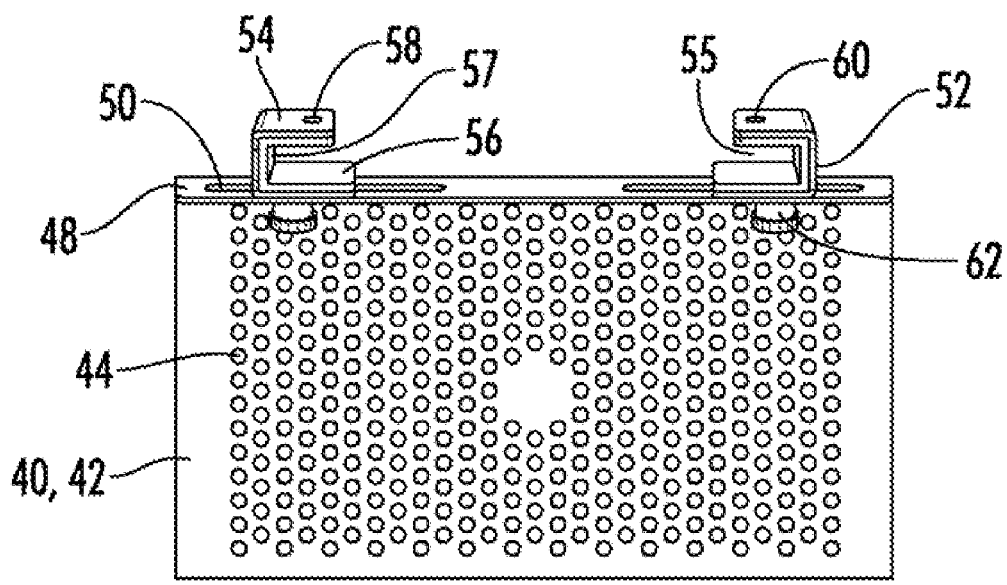
FIG. 15 is a bottom view of one embodiment of a shelf.
Figure 16:
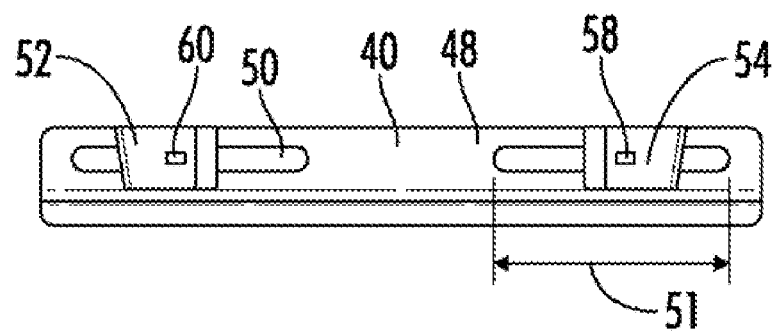
FIG. 16 is a front view of one embodiment of a shelf.

The arm 32 can have many shapes, as seen in FIGS. 8, 9, and 10, with continuing reference to FIGS. 1-7. It can be a bar with a rectangular cross section, a square cross section, an oblong cross section, a round cross section, or almost any other shaped cross section. The arm 32 needs to be strong enough to support the monitor 20, but most monitors 10 are not excessively heavy. The arm 32 can be straight from the base 24 to the monitor attachment 30, or in can be curved, or it can include bends. The bends can be sharp or gradual, they can be close to the base 24, close to the monitor attachment 30, or they can be more in the middle of the arm 32. The arm 32 must have sufficient length to hold the monitor 10 in the desired position, but the arm 32 can any of a wide variety of shapes.

In one embodiment, the stand 20 includes an sloped section 21, where the stand sloped section 21 can be at least a portion of the arm 32 between the base 24 and the monitor attachment 30. In one embodiment with a sloped section 21, the stand sloped section 21 extends from the base 24 at some angle other than a right angle, so the stand 20 angles up from the base 24 to the monitor back end 18. In alternate embodiments, the sloped section 21 is a non-vertical portion of the arm 32, where other portions of the arm 32 may be vertical. The sloped section 21 can facilitate balance in the stand 20 as well as providing a stylish appearance. The stand 20 can also include a tapered portion 23, and the tapered portion 23 can be the same part of the stand 20 as the sloped section 21. The tapered portion 23 can be a section of the stand where the stand width changes along the length of the stand 20. In other embodiments, the stand 20 extends vertically from the base 24, and the stand does not include a sloped section 21. Also, in some embodiments, the stand 20 does not include a tapered portion 23.

Shelf

A shelf 40 is positioned behind the monitor 10, and the shelf 40 serves as a storage device. The shelf 40 is generally positioned above the working surface as well. In some embodiments, the shelf 40 is connected to the stand 20, but in other embodiments the shelf 40 is connected to the monitor back end 18. The shelf 40 is sized to be smaller than the monitor 10, so the shelf 40 is not generally visible for one sitting in front of the monitor 10. The shelf 40 can be positioned a sufficient distance below the top of the monitor 10 to prevent objects on the shelf 40 from being clearly visible from in front of the monitor 10. This provides for discrete storage behind the monitor 10. The shelf 40 can be used to discretely store a wide variety of objects, such as a separate hard drive for the computer, reference books or manuals, spare floppy discs, or portable media players such as those associated with the trademark IPOD.

The shelf 40 can be removably attached to the stand 20 or the monitor 10, and the attachment may be adjustable so the shelf 40 can be positioned in varying positions behind the monitor 10. The shelf 40 can be light, yet strong enough to support objects placed on it. The shelf 40 can be metallic, but it can also be polymeric, wooden, or any of a wide variety of other materials. The shelf 40 should be stiff to provide a stable platform.

The shelf 40 includes a flat portion 42 to place objects on, as seen in FIGS. 11-16, with continuing reference to FIGS. 1-10. The flat portion 42 is at least relatively flat, and is positioned essentially horizontal so objects will not have a tendency to fall off. The flat portion 42 can include one or more gaps 44 to reduce weight, and the gaps 44 can be sized to prevent most objects from passing through a gap 44. The flat portion 42 can be square or rectangular, but it can also be oblong, round, hexagonal, or any of a wide variety of other shapes capable of supporting an object.

The shelf 40 can also include a rail 46 to help keep items on the shelf 40. The rail 46 may also provide some strength to the flat portion 42 by providing an attached surface in a different plane. The rail 46 can be positioned only at the shelf back edge, where the shelf back edge is the shelf edge furthest from the monitor 10. In alternate embodiments, the rail 46 can also be positioned along the shelf side edges, or on any single edge or combination of the edges of the shelf 40. The rail 46 extends upward from the shelf flat portion 42, and can be perpendicular to the flat portion 42. It is also possible for the rail 46 to extend at an obtuse or an acute angle to the flat portion 42. The rail 46 can be formed of the same material as the flat portion 42, or it can be a separate connected piece. The style of the rail 46 can be the same as the flat portion 42, or it can be different. The rail 46 can extend upward from the flat portion 42 for a short distance, such as about one centimeter, or it can extend for a longer distance to form more of a basket-type shape. In other embodiments, the shelf 40 has no rail 46.

The shelf 40 can include a lip 48 on the shelf front edge, which is the shelf edge closest to the monitor 10. The lip 48 can facilitate the attachment of the shelf 40 to the stand 20 or the monitor 10. The lip 48 can define notches 50 which allow for an adjustable connection of the shelf 40 to the stand 20 or monitor 10. The notches 50 can have a notch length 51, such that a connector can be positioned at essentially any point along the notch length 51. The lip 48 can be angled to match the sloped section 21 of the stand arm 32, or the monitor back end 18, or any surface the shelf 40 is connected to. The angle of the lip 48 can be set such that the shelf flat portion 42 remains essentially horizontal when the lip 48 lays flat against the stand 20 or other surface. The angle of the lip 48 relative to the flat portion 42 can be an acute angle in some embodiments, but in other embodiments the angle can be obtuse. The shelf 40 can be more secure and stable when the lip 48 is angled such that the lip 48 lies flat against the surface the shelf 40 is connected to. The lip 48 can extend upward or downward from the shelf flat portion 42. It is also possible to provide a shelf 40 which does not include a lip 48 for attachment of the shelf 40 to the stand 20 or the monitor 10.

The shelf 40 and stand 20 could include engaging shapes, such as one or more indents and matching projections to prevent the shelf 40 from twisting. Other shapes can be used so an engagement between the shelf 40 and the stand 20 or between the shelf 40 and the monitor 10 resists a twisting motion in the shelf 40.

Connectors

One or more connectors 52 are used to connect the shelf 40 to the stand 20 or the monitor 10. A wide variety of connectors 52 can be used, and the connectors 52 can be placed in several different locations. The connectors 52 can be used to hold the lip 48 against the surface the shelf 40 is connected to. Different connectors 52 are more appropriate for different shapes of stands 20 or for connection to the monitor back end 18. It is also possible to use more than one type of connector 52 on a single shelf 40.

In one embodiment, the connector 52 includes two C brackets 54, which may or may not include a protective insert 56. The C bracket 54 can define a recess 58, and the protective insert 56 can include a nipple 60 which engages the recess 58. The C brackets 54 include an open center portion 55, which is the area inside the "C" of the C bracket 54, and the protective insert 56 is positioned in the open center portion 55. The C brackets 54 also include a back wall 57, which is the inside wall in the center portion of the "C" of the C bracket. The back wall 57 can be sloped in some embodiments.

The C brackets 54 can be fixed to the shelf lip 48 with a C bracket screw 62, so the C bracket 54 is held in one position along the lip 48. The C bracket screw 62 can pass through the notches 50 in the shelf lip 48, so the C bracket position can be adjusted along the notch length 51. The C bracket 54 can include a screw receptacle to receive the C bracket screw 62, where the C bracket screw 62 threadedly engages the screw receptacle in the C bracket 54. The C bracket screw 62 can include a wide "head" so a shelf lip 48 can be pinched between the head of the C bracket screw 62 and the C bracket 54 by tightening the C bracket screw 62 into the screw receptacle in the C bracket 54. It is also possible to use spring loaded compression pads in place of the C bracket screw 62, or other connection techniques known to those skilled in the art.

The C brackets 54 are fixed to the lip 48 such that the open center portions 55 of the C brackets 54 face each other. In this embodiment, the shelf 40 can be attached to a tapered portion 23 of a stand 20, where the arm 32 is wider at lower portions and narrower at higher portions. The stand edge is inserted into the open center portion 55 within the protective insert 56 in the C bracket 54, and the shelf 40 is slide down until the stand 20 becomes pinched between the two C brackets 54. The C bracket back wall 57 can be a sloped back wall 57, where the angle of the sloped back wall 57 is set to match the taper angle of the tapered portion 23, so the back wall 57 lays flat against the edge of the tapered portion 23. The "taper angle" is the angle at which the stand tapers as compared to a stand with no taper.

Different stand thicknesses can be accommodated with one size C bracket 54 by including a plurality of protective inserts 56 with varying thicknesses. The protective insert 56 thus serves to protect the stand 20 from the C bracket 54, and the protective insert 56 also serves as a shim so the connector 52 is properly sized to securely attach the shelf 40 to the stand 20. Adjusting the distance between the two C brackets 54 by moving the C brackets 54 along the notch length 51 of the shelf lip notch 50 allows for the position of the shelf 40 to be adjusted.

Figure 17:
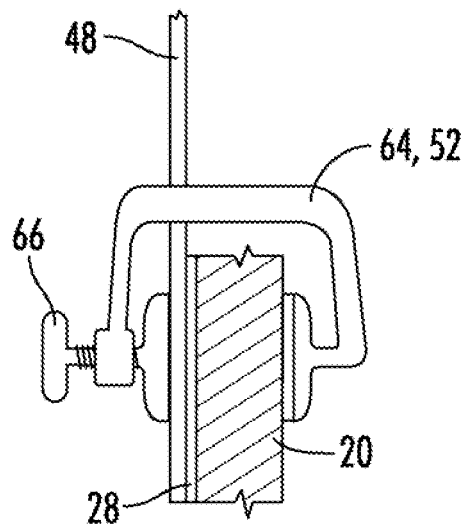
FIG. 17 is a bottom view of a C clamp and a shelf lip attached to a sectioned portion of a stand.
Figure 18:
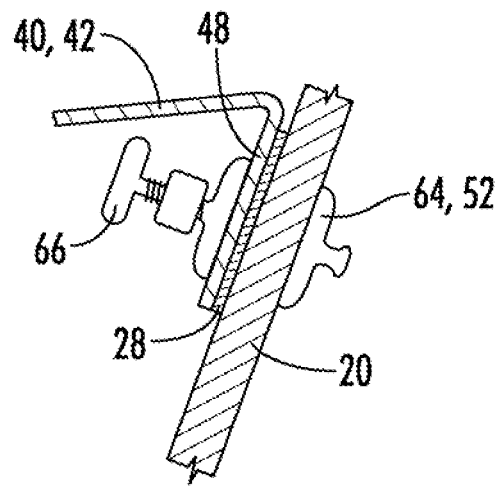
FIG. 18 is a side view of a C clamp and a sectioned view of a stand, shelf, and protective pad.

In an alternative embodiment, the connector includes one or more C clamps 64, as seen in FIGS. 17 and 18, with continuing reference to FIGS. 1-16. The C clamp 64 holds the lip 48 securely against the stand 20 with pressure from a C clamp screw 66. A protective pad 28 can be used if desired. The C clamp screw 66 could be replaced or supplemented with a spring device in alternative embodiments. The position of the shelf 40 can be adjusted by positioning the C clamp 64 at different locations. There can be a C clamp 64 positioned on each side of the stand 20, or there could be one C clamp 64 positioned near the middle, or other positions and/or numbers of C clamps 64 could be used.

Figure 19:
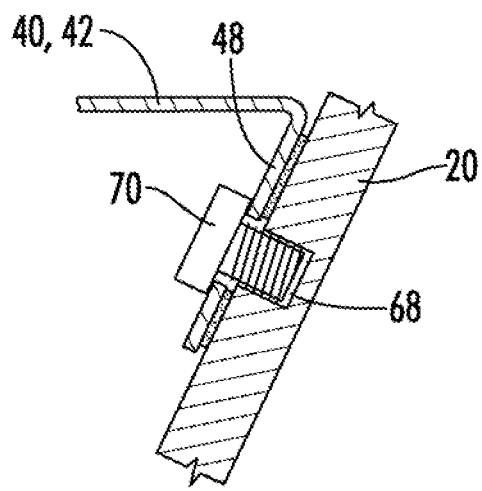
FIG. 19 is a side view of an alternative embodiment of a connector with a sectioned view of a stand, shelf, and protective pad.

Another alternative embodiment includes an indentation 68 defined in either the stand 20 or the monitor back end 18, as seen in FIG. 19, with continuing reference to FIGS. 1-18. The indentation 68 could be threaded, or it could be smooth. An indentation screw 70 engages the threaded indentation 68 and secures the lip 48 in place. If the indentation 68 were smooth, a rod could be inserted to secure the lip 48 in place. Alternatively, the rod or indentation screw 70 could extend under a significant portion of the shelf flat portion 42, and the shelf 40 could be supported by the rod or indentation screw 70 without the use of a lip 48.

Figure 20:
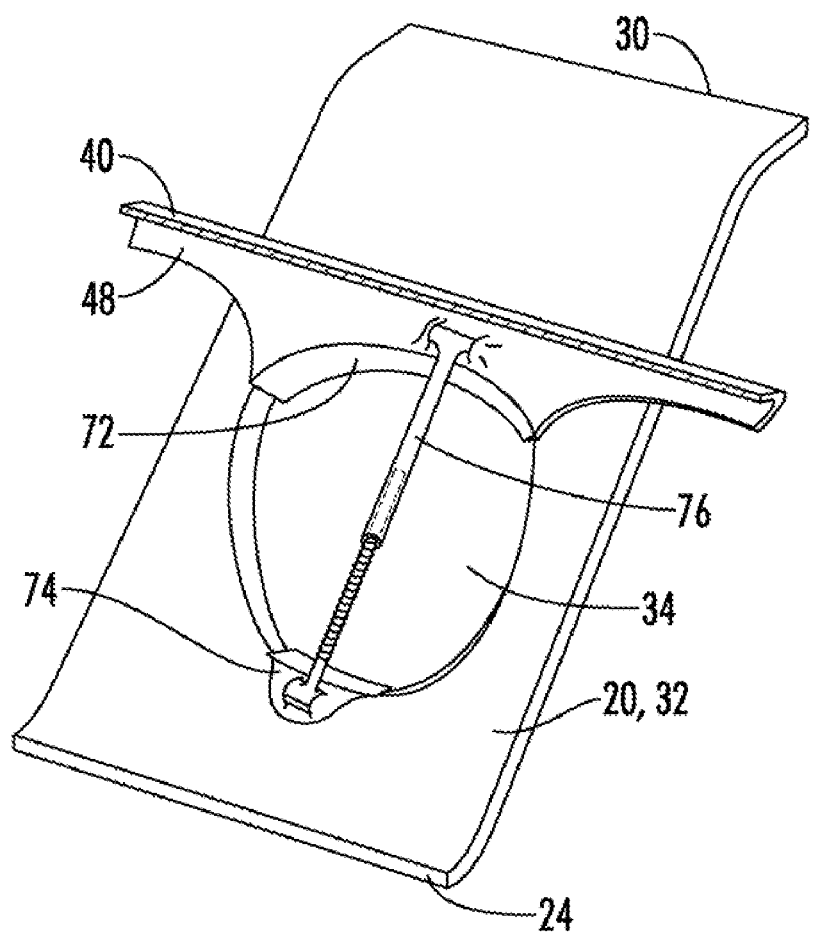
FIG. 20 is a back perspective view of another alternative embodiment of a connector with a stand and a sectioned view of a shelf.

In yet another embodiment, the shelf 40 is connected to the hole 34 defined in the stand arm 32, as seen in FIG. 20, with continuing reference to FIGS. 1-19. An upper bracket 72 engages an upper portion of the hole 34, and a lower bracket 74 engages a lower portion of the hole 34. The upper bracket 72 can be directly connected to the shelf 40, and an extension arm 76 can connect the lower bracket 74 to the shelf 40. The extension arm 76 can be adjustable, such as with a male and female threaded portion or with a spring loaded action, to facilitate attachment of the shelf 40 to the stand 20. There can also be hinge type connections for the extension arm 76 to facilitate attachment to the stand 20.

Figure 21:
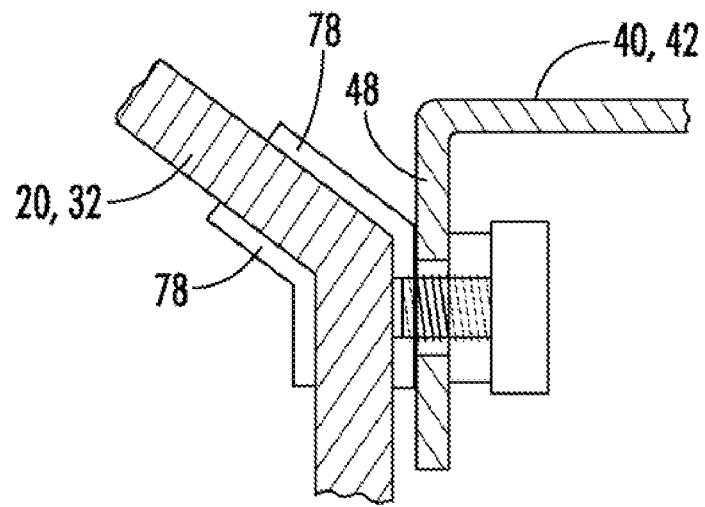
FIG. 21 is .a side view of yet another embodiment of a connector with a sectioned view of a stand and a shelf.

In still another embodiment, a bend catch 78 can be used as the connector 52, as seen in FIG. 21, with continuing reference to FIGS. 1-20. The bend catch 78 is sized to match and engage a bend in the stand 20, so the bend catch 78 cannot move up and down the stand 20 due to the geometry of the stand 20 and the connector 52. The shelf 40 may not be adjustable in height when using a bend catch 78, unless alternative methods such as vertical notches 50 in the lip 48 are employed.

Figure 22:
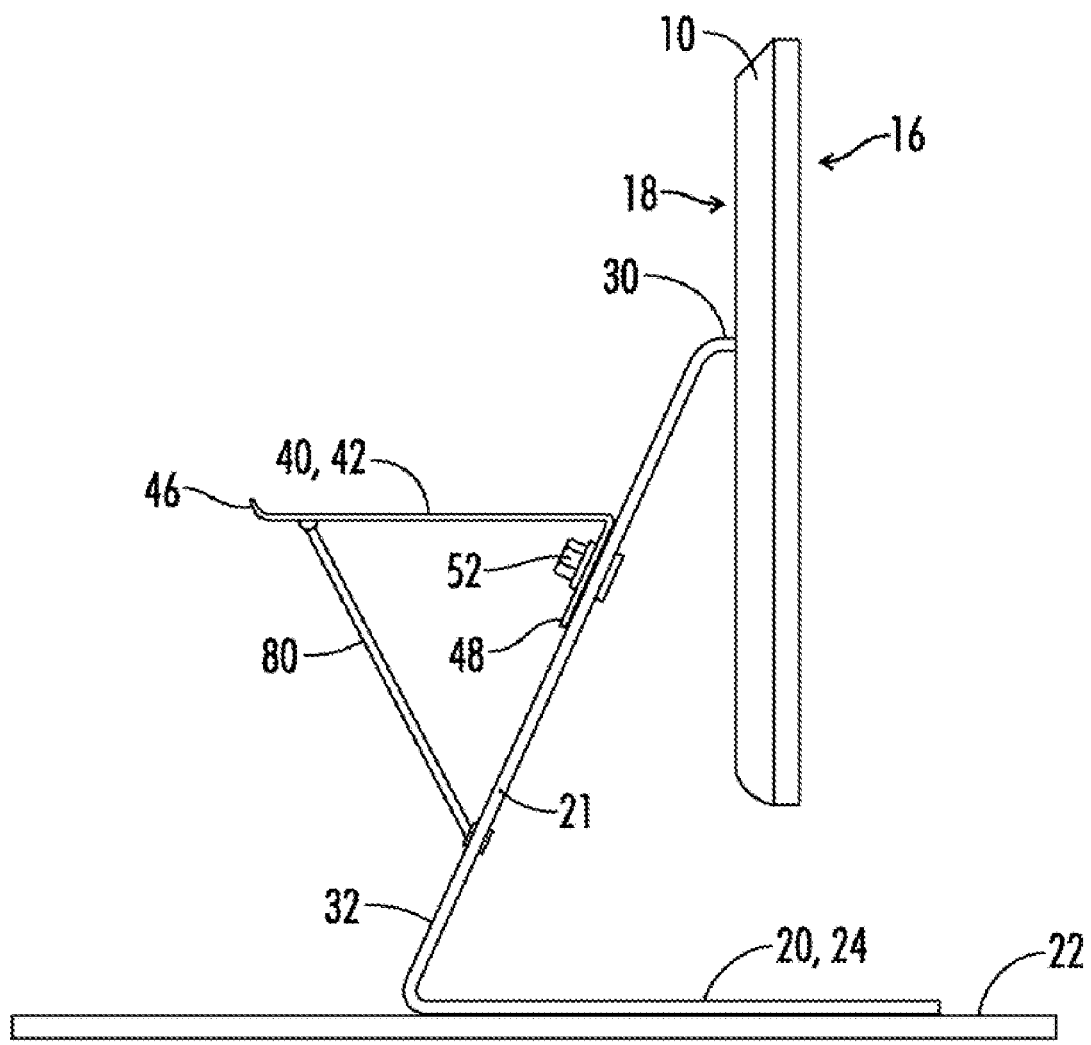
FIG. 22 is a side view of a monitor on a stand with a shelf and a support leg.

A support leg 80 can be used with many of the connectors 52 described, as seen in FIG. 22, with continuing reference to FIGS. 1-21. The support leg 80 is connected to the shelf flat portion 42 and extends downward. The support leg 80 provides an additional support for the shelf 40, and can provide greater stability and strength. The lower portion of the support leg 80 can rest on the working surface 22, or it can rest or be connected to the stand 20. There can be a notch provided in the stand 20 to receive the support leg 80, or the support leg 80 can be configured to connect to the hole 34 in the stand arm 32. The support leg 80 can also be configured to connect to the stand base 24, or the stand arm 32, or the working surface 22 using various other connectors or ends. There can be one or more support legs 80, and if a plurality of support legs 80 is used they can extend to the same general location or to different locations.

There are other types of connectors 52 which could be used. These other types of connectors 52 include, but are not limited to, wedge type connectors, welded, glued, or soldered connectors 52, hook and loop connectors 52, hose clamp type connectors 52, or even no connector 52 where the shelf 40 is formed as an integral part of the stand 20.

While the invention has been described with respect to a limited number of embodiments, those skilled in the art, having the benefit of this disclosure, will appreciate that other embodiments can be devised which do not depart from the scope of the invention as disclosed here. Accordingly, the scope of the invention should be limited only by the attached claims.

I claim:
1. A storage device comprising:
   a computer monitor comprising a monitor back end and a monitor front end;
   a stand connected directly to the monitor back end, where the stand comprises a base resting on top of a working surface such that the monitor is suspended above the working surface;
   a shelf which comprises a flat portion and a lip, and where the lip comprises notches having a notch length; and
   a connector connecting the shelf to the stand, where the connector comprises a C bracket and a C bracket screw, and where the C bracket screw passes through the notches and secures the C bracket to the lip such that the C bracket is adjustable along the notch length.

2. The storage device of claim 1 where the stand comprises a tapered section having a taper angle, and the connectors are connected to the stand tapered section.

3. The storage device of claim 2 where the C bracket comprises a sloped back wall angled to match the taper angle.

4. The storage device of claim 1 where the stand comprises a sloped section, and the lip is angled to match the sloped section of the stand so the shelf flat portion is essentially horizontal when the lip is secured flat against the stand.

5. The storage device of claim 1 where the shelf comprises a rail.

6. The storage device of claim 1 where the C bracket further comprises an open center portion;
the storage device further comprising a protective insert positioned in the open center portion, and where a thickness of the protective insert is selected to provide a secure fit between the C bracket and the stand.

7. A storage device comprising:
a computer monitor comprising a monitor back end and a monitor front end;
a stand connected directly to the monitor back end, where the stand comprises a base resting on top of a working surface such that the monitor is suspended above the working surface, and where the stand further comprises a sloped section between the base and the computer monitor;
a shelf positioned behind the monitor and above the working surface; and
a connector connecting the shelf to the sloped section of the stand.

8. The storage device of claim 7 where the shelf further comprises a lip and a flat portion, and where the lip extends at an acute angle from the flat portion so the lip can lay flat against the sloped section of the stand while the flat portion remains essentially horizontal.

9. The storage device of claim 8 where the connector comprises a C bracket with a C bracket screw, where the lip defines a notch with a notch length, and where the C bracket screw passes through the notch and threadedly engages the C bracket.

10. The storage device of claim 9 where the stand sloped section is tapered at a taper angle, and where the C bracket further comprises a sloped back wall angled to match the taper angle.

11. The storage device of claim 9 further comprising a protective insert positioned within the C bracket.

12. A storage device comprising:
a computer monitor comprising a monitor back end and a monitor front end;
a stand connected directly to the monitor back end, where the stand comprises a base resting on top of a working surface such that the monitor is suspended above the working surface;
a shelf positioned behind the monitor and above the working surface; and
a connector which secures the shelf to the stand, where the connector is selected from the group consisting of a C bracket, a clamp, a bend catch, and any combination of a C bracket, a clamp, and a bend catch.

13. The storage device of claim 12 where the stand further comprises a sloped section, and the connector is secured to the stand sloped section.

14. The storage device of claim 12 where the stand further comprises a tapered portion, and the connector is secured to the tapered portion.

15. The storage device of claim 12 where the shelf comprises a lip and a flat portion, and where the lip extends from the flat portion at an angle such that the lip lays flat against the stand while the flat portion is essentially horizontal.

16. The storage device of claim 15 where the lip defines notches having a notch length, and where the connector is secured to the shelf through the notches such that the connector can be adjusted along the notch length.

17. A storage device comprising;
a shelf, where the shelf comprises a flat portion and a lip, where the lip comprises a plurality of notches, and where each notch has a notch length; and
a connector comprising a C bracket, where the connector comprises a protective insert and a C bracket screw, where the C bracket screw passes through the notch so the position of the connector can be adjusted along the notch length, and where the C bracket further comprises an open center portion and a sloped back wall.

18. The storage device of claim 17 where the shelf further comprises a rail.

19. The storage device of claim 17 where the lip extends from the shelf flat portion at an acute angle such that the lip can be pressed flat against an angled support while the flat portion is horizontal.

20. The storage device of claim 17 where the C bracket further comprises a screw receptacle and the C bracket screw threadedly engages the screw receptacle.

* * * * *